United States Patent
Choi (10) Patent No.: US 7,613,123 B2
(45) Date of Patent: *Nov. 3, 2009

(54) APPARATUS AND METHOD FOR ESTABLISHING NETWORK

(75) Inventor: Dang Woo Choi, Osan-si (KR)

(73) Assignee: LG Electronics Inc., Seoul (KR)

( * ) Notice: Subject to any disclaimer, the term of this patent is extended or adjusted under 35 U.S.C. 154(b) by 759 days.

This patent is subject to a terminal disclaimer.

(21) Appl. No.: 11/252,826

(22) Filed: Oct. 19, 2005

(65) Prior Publication Data

US 2006/0268862 A1  Nov. 30, 2006

(30) Foreign Application Priority Data

May 27, 2005  (KR)  ...................... 10-2005-0044822

(51) Int. Cl.
  *G01R 31/08* (2006.01)
  *H04L 12/28* (2006.01)
(52) U.S. Cl. .................................. 370/242; 370/395.2
(58) Field of Classification Search ................. 370/389, 370/392.2, 401–403, 392, 475, 254–255, 370/395.2
  See application file for complete search history.

(56) References Cited

U.S. PATENT DOCUMENTS

| | | | | |
|---|---|---|---|---|
| 5,724,510 | A * | 3/1998 | Arndt et al. ................. | 709/220 |
| 5,978,854 | A | 11/1999 | Fujimori et al. ............. | 709/245 |
| 6,516,000 | B1 * | 2/2003 | Kshirsagar et al. .......... | 370/410 |
| 6,603,769 | B1 * | 8/2003 | Thubert et al. .............. | 370/401 |
| 6,754,716 | B1 * | 6/2004 | Sharma et al. .............. | 709/238 |
| 6,785,738 | B1 | 8/2004 | Ivaturi ........................ | 709/245 |
| 6,826,611 | B1 * | 11/2004 | Arndt ......................... | 709/226 |
| 6,826,623 | B1 * | 11/2004 | Brown et al. ................ | 709/239 |
| 6,856,602 | B1 * | 2/2005 | Westberg .................... | 370/254 |
| 7,051,087 | B1 * | 5/2006 | Bahl et al. ................... | 709/220 |
| 7,088,689 | B2 * | 8/2006 | Lee et al. .................... | 370/282 |
| 7,307,962 | B2 * | 12/2007 | Pulsipher .................... | 370/254 |
| 7,352,726 | B2 * | 4/2008 | Fujisawa ..................... | 370/338 |
| 7,356,032 | B1 * | 4/2008 | Sumorok ..................... | 370/392 |
| 7,376,743 | B1 * | 5/2008 | Bazzinotti et al. ........... | 709/229 |

(Continued)

FOREIGN PATENT DOCUMENTS

TW  529283 B  4/2003

(Continued)

*Primary Examiner*—Kwang B Yao
*Assistant Examiner*—Candal Elpenord
(74) *Attorney, Agent, or Firm*—Ked & Associates LLP (57) ABSTRACT

Embodiments of a method and apparatus can establish a network using pre-set IP information when a host is coupled to a network. In an embodiment of a network establishment method, ARP response information can be compared with pre-stored set information using a predetermined calculation so to decide a set, an ARP can be broadcasted to determine whether the decided set is applicable to a network, and, if a response for one or more ARP is received, the decided set can be established as a network. In another embodiment of a network establishment method, an ARP can be broadcasted using pre-stored set information, and if a response for the ARP is received, a network can be established. According to embodiments of the invention, by applying an appropriate available setting among pre-set TCP/IP settings without manually establishing a TCP/IP connection, direct connection (e.g., Plug-and-Play) of a network can be performed.

4 Claims, 10 Drawing Sheets

U.S. PATENT DOCUMENTS

| | | | |
|---|---|---|---|
| 7,472,179 B2 * | 12/2008 | Tarui et al. | 709/223 |
| 2002/0052972 A1 * | 5/2002 | Yim | 709/245 |
| 2002/0156898 A1 * | 10/2002 | Poirier et al. | 709/227 |
| 2003/0185186 A1 | 10/2003 | Tsutsumi et al. | 370/338 |
| 2003/0210691 A1 | 11/2003 | Chen et al. | 370/389 |
| 2004/0100934 A1 * | 5/2004 | Kachi | 370/338 |
| 2004/0184458 A1 * | 9/2004 | Shimada | 370/392 |
| 2004/0193716 A1 * | 9/2004 | McConnell | 709/228 |
| 2005/0135422 A1 * | 6/2005 | Yeh | 370/474 |
| 2005/0180439 A1 * | 8/2005 | Kondo et al. | 370/401 |
| 2006/0126614 A1 * | 6/2006 | Logan | 370/389 |

FOREIGN PATENT DOCUMENTS

| | | |
|---|---|---|
| TW | 580811 B | 3/2004 |
| TW | 232655 B | 5/2005 |

* cited by examiner

Fig. 11

APPARATUS AND METHOD FOR ESTABLISHING NETWORK

BACKGROUND OF THE INVENTION

1. Field of the Invention

The present invention relates to an apparatus and a method for establishing a network using pre-set IP information when a host is plugged in to a wired or wireless network.

2. Background of the Related Art

In the conventional art, the 802.3 Ethernet adopts a method for establishing a network by manually varying TCP/IP settings according to where a cable is plugged in for access.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and a method for establishing a network that can solve at least the problems and disadvantages of the background art or provide at least the advantages set forth herein.

Another object of the present invention is to provide an apparatus and a method for establishing a network that can automatically establish a network by applying an appropriate available setting among pre-set TCP/IP settings without manually establishing a TCP/IP connection.

Another object of the present invention is to provide an apparatus and a method for establishing a network that can directly establish a TCP/IP connection on the basis of stored IP information as soon as a user plugs in a network cable when TCP/IP settings have been stored in the user's computer.

To achieve at least the above objects or advantages described herein in a whole or in part, in accordance with one aspect of the invention, there is provided a network establishment method and apparatus for automatically establishing a TCP/IP connection on the basis of stored IP information as soon as a user plugs in a network cable when TCP/IP settings have been stored in the user's computer.

To further achieve at least the above objects or advantages described herein in a whole or in part, in accordance with on aspect of the invention, there is provided a network establishment method that can include automatically downloading an address and establishing a connection to a current network using the address; and, if the connection fails, establishing a connection to the current network using pre-stored network information corresponding to at least one network.

Further, network information included in an address resolution protocol (ARP) packet received from an apparatus connected to the current network can be compared with the pre-stored network information.

Further, a network establishment method and apparatus can include pre-storing a plurality of network set information for network connection, broadcasting an ARP using the pre-stored network set information and receiving an ARP response and establishing a connection to the current network on the basis of the ARP response.

To further achieve at least the above objects or advantages described herein in a whole or in part, in accordance with on aspect of the invention, there is provided a method of establishing a connection to a network of devices that includes initiating a connection to a current network with IP address information of a current network unknown and establishing the connection with the IP address information of the current network received from another device connected to the current network.

To further achieve at least the above objects or advantages described herein in a whole or in part, in accordance with on aspect of the invention, there is provided a method of establishing a connection to a network of devices that includes attempting to make a connection to a current network using at least one prestored network information corresponding to a plurality of networks.

To further achieve at least the above objects or advantages described herein in a whole or in part, in accordance with on aspect of the invention, there is provided a computer program product embodied on at least one computer-readable medium, for establishing a connection to a network of devices, the computer program product includes computer executable code configured to automatically make a connection to a current network using prestored network information corresponding to a plurality of networks.

To further achieve at least the above objects or advantages described herein in a whole or in part, in accordance with on aspect of the invention, there is provided a host for establishing a connection to a network of devices that includes a processor configured to connect to a current network using prestored network information corresponding to a plurality of networks.

To further achieve at least the above objects or advantages described herein in a whole or in part, in accordance with on aspect of the invention, there is provided a network system that includes a plurality of hosts for establishing a connection to a network, at least one of the hosts including a processor configured to make a connection to a current network using prestored network information corresponding to a plurality of networks.

To further achieve at least the above objects or advantages described herein in a whole or in part, in accordance with on aspect of the invention, there is provided a network establishment method that includes transmitting an ARP packet using pre-stored network information corresponding to at least one network, receiving an ARP response for the ARP packet and establishing a network according to the ARP response.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Embodiments of a network establishment apparatus and methods according to the invention will be described.

In order to establish a TCP/IP protocol environment in a host using the Ethernet, an IP address, a subnet mask, a default gateway, etc. are required. These parameters are well known to those skilled in the art, and therefore, detailed descriptions thereof are omitted here.

Figure 1:
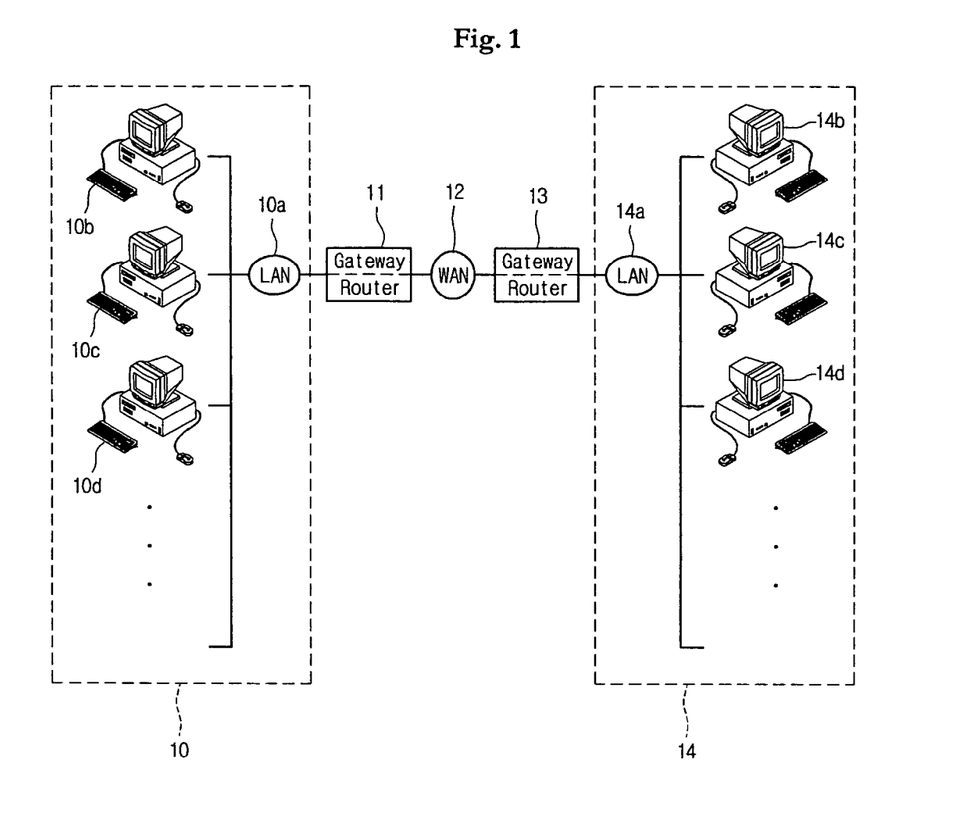
FIG. 1 is a diagram illustrating a general network configuration in which a plurality of hosts are connected with each other.

FIG. 1 is a diagram illustrating a general network configuration in which a plurality of hosts can be coupled to each other, (e.g., wired and wireless). As shown in FIG. 1, the general network configuration can include a first 802.3 Ethernet network 10, a second 802.3 Ethernet network 14, communication interfaces 11 and 13 each including a gate way or a router, and a wide area network (WAN) 12.

The first 802.3 Ethernet network 10 can include a LAN 10a and a plurality of hosts 10b, 10c, and 10d. The second 802.3 Ethernet network 14 can include a LAN 14a and a plurality of hosts 14b, 14c, and 14d.

Figure 2:
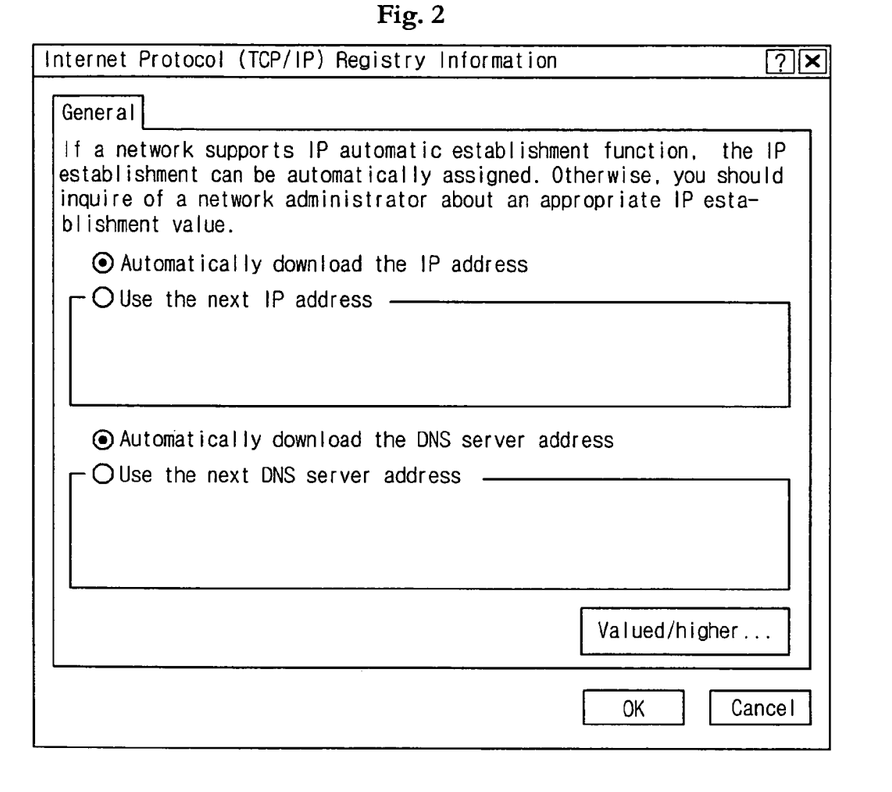
FIG. 2 is a diagram that illustrates a screen representing general Internet protocol (TCP/IP) registration information stored in each host shown in FIG. 1.

FIG. 2 illustrates a screen representing general Internet protocol (TCP/IP) registration information when each host shown in FIG. 1 is in a Dynamic Host Configuration Protocol (DHCP) mode. According to the TCP/IP registration information shown in FIG. 2, IP-related information can be automatically provided when a host is plugged in to a network. Accordingly, whenever a host accesses a network, an arbitrary IP address can be variably set.

Figure 3:
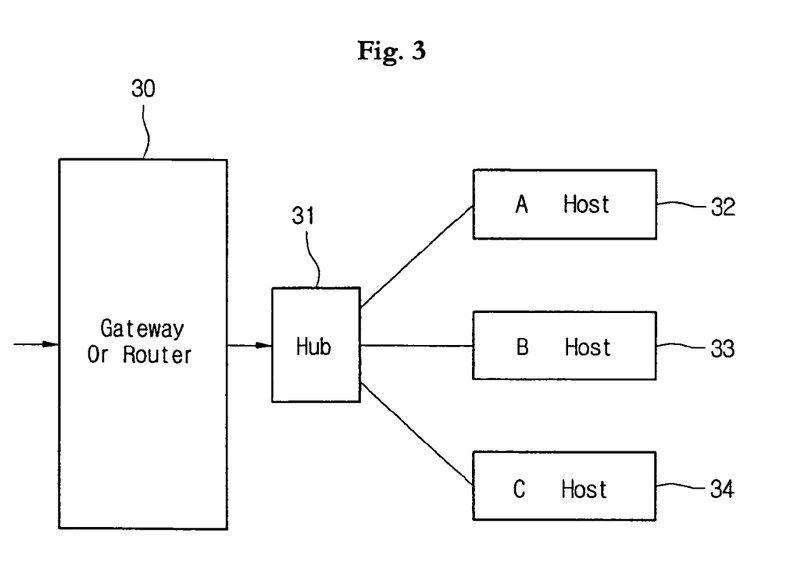
FIG. 3 is a network configuration diagram that illustrates communication over a network.

FIG. 3 is a network configuration diagram for describing a general concept of communication over a network. As shown in FIG. 3, a network configuration can include a communication interface 30 including a gateway or a router each with address information, one or more hosts 32, 33, and 34 with IP and MAC (Media Access Control) addresses, and a HUB 31 located between the communication interface 30 and the hosts 32, 33, and 34.

A description for an address resolution protocol (ARP) will now be provided. In general, a data frame transmitted through a network must contain a MAC address as a physical hardware address of a network card, as well as an IP address of a destination computer.

When a data frame containing only an IP address of a destination computer without a MAC address is received, a protocol for detecting a MAC address from the IP address can be determined. For example, an ARP is a protocol for detecting a hardware address of a host, such as an Ethernet address of a data link layer, using an IP address used in a TCP/IP network layer. The ARP can be used for corresponding an IP address to a physical network address on an IP network.

Figure 4:
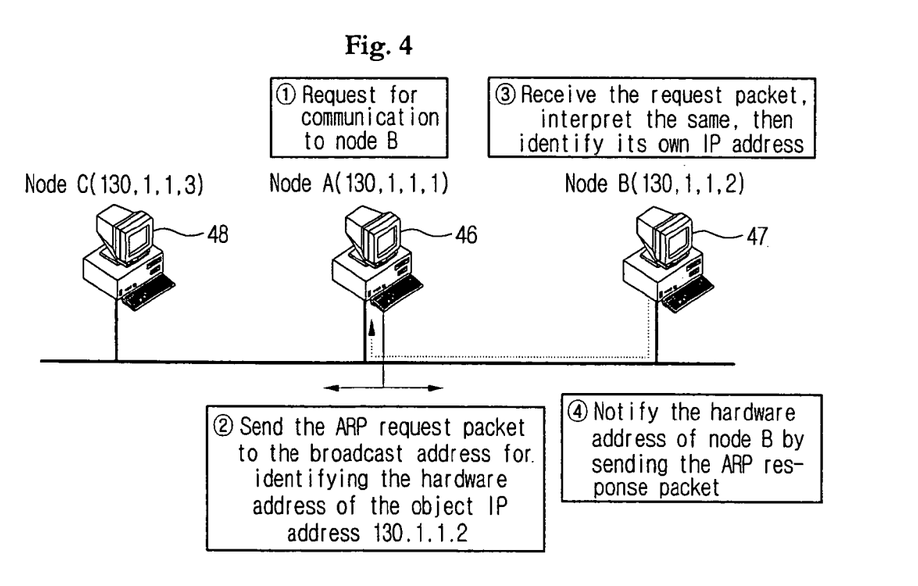
FIG. 4 is a diagram that shows an ARP request and an ARP response between hosts.

FIG. 4 is a diagram describing an ARP request and an ARP response between hosts. As shown in FIG. 4, a node A 46 tries to access a node B 47.

At this time, the node A 46 can broadcast an ARP request packet containing IP address (130.1.1.2) information of the node B 47 for detecting a MAC address (e.g., hardware address) of the node B 47 on a network. Other nodes 47 and 48 on the network can receive the broadcasted ARP request packet, interpret the contents of the received ARP request packet, and transmit an ARP response packet to the node A 46 for informing the node A 46 of a MAC address (e.g., hardware address) of the node B 47 corresponding to the IP address of the node B 47.

As a result, a hardware address can be acquired from an IP address through the ARP response and request. Thus, communication can be allowed between nodes.

Figure 5:
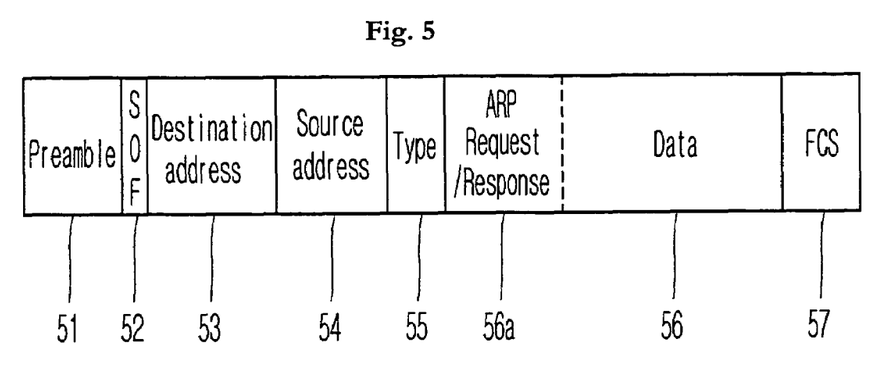
FIG. 5 is a diagram that illustrates a frame format of a packet used for an ARP request or response.

FIG. 5 illustrates an exemplary frame format of a packet used for the ARP request and response. As shown in FIG. 5, the frame format can include 7 bytes of preamble 51, 1 byte of SOF (Start Of Frame) 52, 6 bytes of destination address 53, and a source address 54. The upper 3 bytes of the 6 bytes can be used for identifying the vendor of an Ethernet network interface card (NIC) (e.g., as defined in Internet assigned numbers authority (IANA)), and the remaining lower 3 bytes can be defined by the vendor.

As shown in FIG. 5, the source address 54 is preferably always a unicast (single mode) address and the destination address 53 may be one of unicast, multicast, and broadcast addresses. Also, the frame format can include 2 bytes of Type 55, 46-1500 bytes of data 56, and 4 bytes of FCS (Frame Check Sequence) 57. The data 56 can contain an ARP Request/Response 56a.

Figure 6:
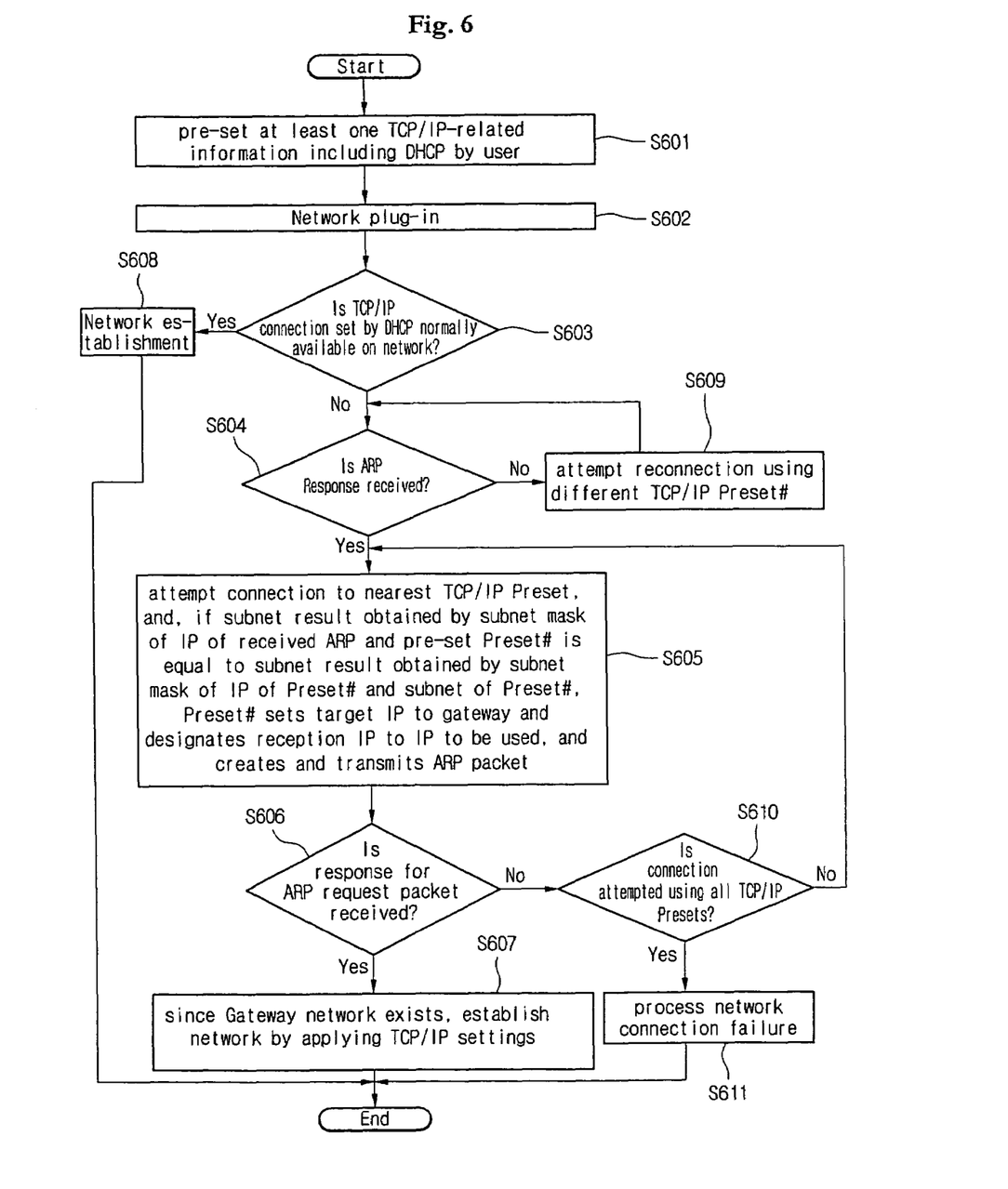
FIG. 6 is a first flowchart illustrating an embodiment of a method for establishing a network on the basis of TCP/IP Preset# information.

FIG. 6 is a first flowchart illustrating a first embodiment of a method for establishing a network on the basis of TCP/IP Preset# information predetermined by a user. As shown in FIG. 6, one or more TCP/IP Preset#'s can be set in the Host (for example, Host 3 (83) in FIG. 8) coupled to the network (block S601). The TCP/IP Preset#'s can include DHCP.

If the Host is plugged in to the network, the Host can identify whether the TCP/IP set by the DHCP is normally usable (blocks S602 and S603). If the network can be established by the DHCP, the user can connect to and use the network thereof (block S608).

However, if the network establishment is not available by the DHCP, an ARP request can be performed by using the hosts (e.g., 81 and 82 in FIG. 8) already joined in the network or the information of the TCP/IP Preset#1, 2 set by the user (e.g., 83 in FIG. 8), whereby it can be determined whether the ARP response to the ARP request is received (block S604).

If the ARP broadcast is received from other host, a TCP/IP preset, which is most close to the ARP broadcast information, can be used first to attempt to connect to the network (block S605). That is, broadcast accessibility and the access priority order can be determined based on the received ARP information and the TCP/IP information of each TCP/IP Preset# (e.g., through the process of ⑧ FIG. 8).

In exemplary detail, if a subnet result obtained by an IP of the received ARP and a subnet mask of the at least one predetermined Preset# is equal to the result obtained by an IP of the Preset# and the subnet of the Preset#, the corresponding Preset# (e.g., TCP/IP Preset#2 in FIG. 8) can be established.

As described above, the IP information and subnet mask information can each have 32 bits, respectively. The 32 bits can be divided into 4 parts by 8 bit and then the parts can be respectively indicated to decimal. The decimal is respectively transformed into binary bit. The respective binary bits of IP information and subnet mask information are processed by a (e.g., logic operation) AND operation. The preset that has the same result from the AND operation preferably establishes a network.

As to TCP/IP Preset#2 selected from the step S605, prior to the TCP/IP set, the ARP request/test broadcasting can be performed to identify whether it is actually possible to access the network using the Preset #2. Accordingly, it can then be identified whether the ARP response is received to the ARP request/test (block S606).

If the ARP response is received (e.g., as a result of the determining block S606), the IP information of TCP/IP Preset#2 can be applied to use it in the network connection since it confirms that the gateway corresponding to Preset #2 exists and the IP is usable (block S607). In other words, if the response to the ARP packet is received at block S606, the corresponding gateway exists in the connected network. So, it is possible to connect to the network by applying the selected TCP/IP preset.

If the ARP response is not received as a result of the determining (block S604), the access operation can be repeatedly performed by using the information of other TCP/IP Preset(s)# (block S609).

If the ARP response is not received as a result of the determining block S606, the ARP request/test packet generation can be repeatedly performed by using the information of other TCP/IP Preset#'s as set by the user (e.g., blocks S610, S605 and S606 repeated). If the ARP response is not received even after all the presets are used, then a network access failure can be processed (blocks S610 and S611).

In block S606, it can be determined whether a response for the ARP packet transmitted in block S605 is received or not. From blocks S608, S607 and S611, the process can be completed.

Figure 7:
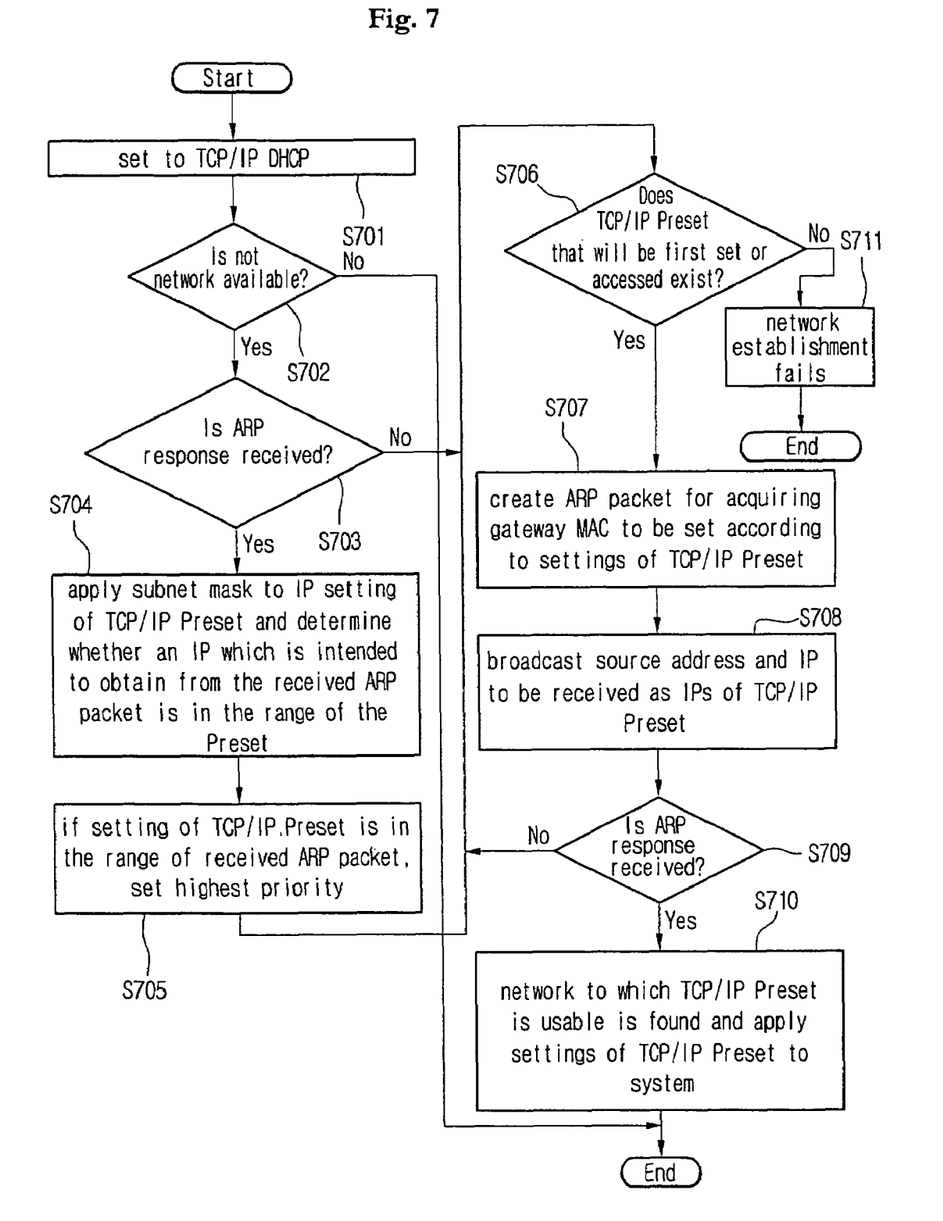
FIG. 7 is a second flowchart illustrating an embodiment of a method for establishing a network on the basis of TCP/IP Preset# information.

FIG. 7 is a second flowchart illustrating an embodiment of a method for establishing a network on the basis of the TCP/IP Preset# information pre-set by a user. FIG. 7 describes an algorithm that can directly or automatically search for and establish TCP/IP settings after a Media Connect Event occurs (for example, after a LAN cable is plugged in).

As shown in FIG. 7, TCP/IP of a host can be set to TCP/IP DHCP (operation S701). If an automatic network set-up according to the DHCP is normally available, the automatically set-up network preferably is established.

If the automatically set-up network is not available (operation S702), it can be determined whether a history file of ARP packet receipt from a host already joined in a corresponding network (e.g., 81 or 82 of FIG. 8) exists or not (operation S703). When the ARP response exists, by applying subnet mask information to the IP setting information of the corresponding TCP/IP Preset, it can be determined whether an IP, which is intended to obtain from the received ARP packet, is in the range of the Preset (operation S704).

Figure 8:
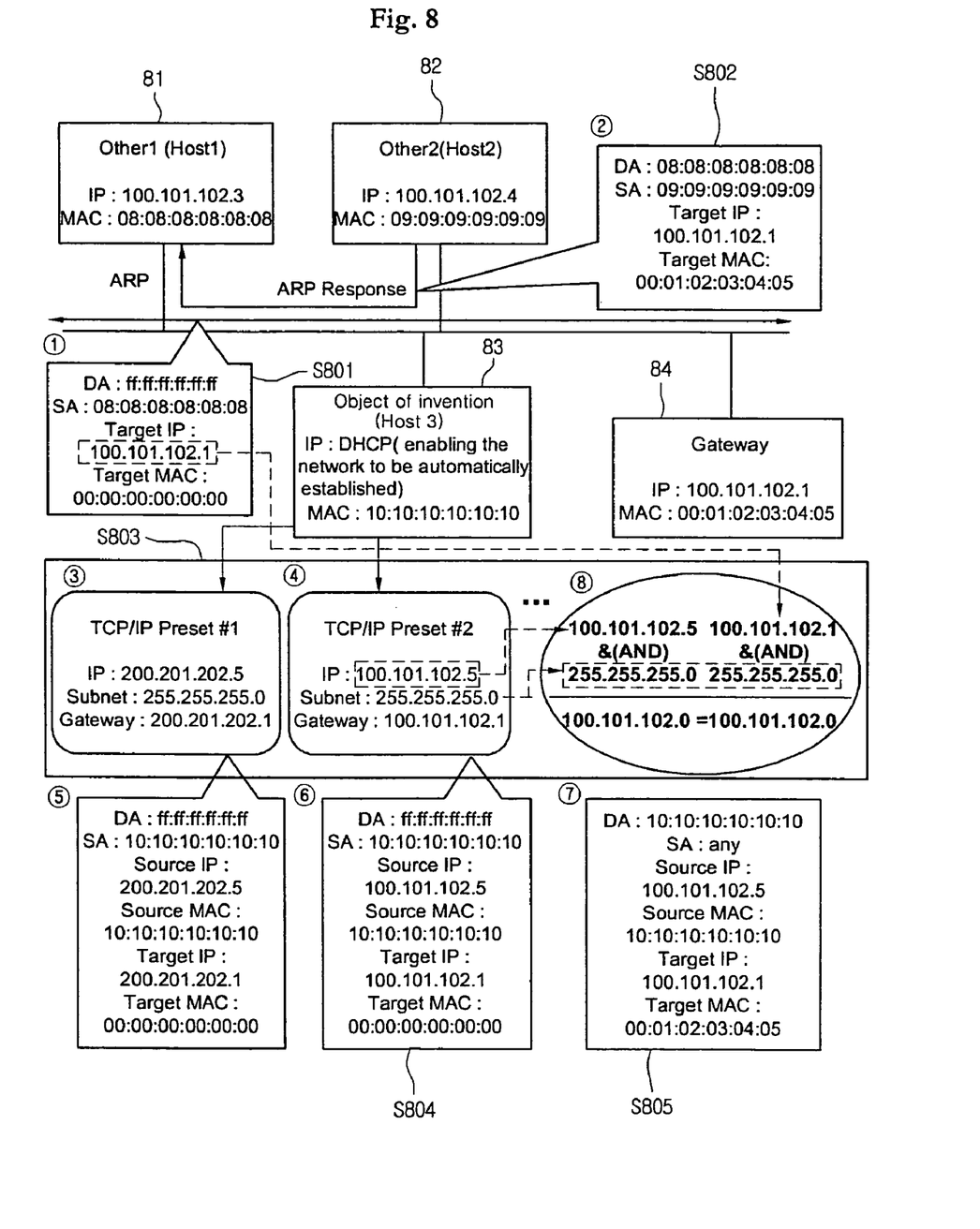
FIG. 8 is a block diagram that illustrates an exemplary method for establishing a network through switching based on an ARP request/response and IP information pre-set by a user, according to an embodiment of the invention.

The ARP packet received from a network, in which the settings of the corresponding TCP/IP Preset are established, can be analyzed (e.g., through the operation ⑧ of FIG. 8). For example, after determining whether it is in the same subnet or not, it can be determined whether a preset exists in the same subnet or not. In other words, it can be determined whether or not there is a TCP/IP Preset that will be first set or accessed (operations S705 and S706).

If there is the TCP/IP Preset, an ARP packet for acquiring a gateway MAC to be set according to the settings of the TCP/IP Preset can be created (operation S707). A source address and an IP to be received can be broadcasted as IPs of the TCP/IP Preset (e.g., operation ⑥ of FIG. 8) (operation S708).

Then, if an ARP response is received (e.g., operation ⑦ of FIG. 8), this means that a network in which the TCP/IP Preset can be used is found. Accordingly, the settings of the TCP/IP Preset (e.g., Preset#2 of FIG. 8) can be applied to the system (operation S710).

Meanwhile, if it is determined in operations S706 and S709 that no TCP/IP Preset that will be accessed exists or that no ARP response is received, an attempt for a network establishment can be determined to fail (operation S711). From operations S701, S710 and S711, the process can be completed.

In flowcharts shown in FIGS. 6 and 7, checking a second ARP request and a second ARP response (e.g., S804 of FIG. 8) can determine whether a correct gateway or MAC exists and whether the IP is available. However, the invention is not intended to be so limited. For example, a prescribed number (e.g., 4) attempts can be made or this process can be omitted according to a setting of a user, and a direct connection can then be attempted.

FIG. 8 is a block diagram describing an exemplary method for establishing a network through switching based on an ARP request/response and IP information pre-set by a user, according to one embodiment of the invention. As shown in FIG. 8, there can be a first host with one or more hosts host1 and host2 (81 and 82) joined to a network, a host3 (83) attempting to be joined to the network and storing TCP/IP Preset#1 or #2 information, and a second host including a gateway 84, which is a communication interface.

Considering a calculation ⑧ used in blocks S801 and S803 of FIG. 8, when the target host3 (83) including the Preset#1 or Preset#2 accesses a network to be joined to the network, if the Preset#1 and/or Preset#2 receives an ARP request broadcasted by the host1 81 joined to the network, it can be determined whether or not a subnet result obtained by a subnet mask of an IP address included in the received ARP request and a preset subnet of the Preset#1 or Preset#2 is equal to a subnet result obtained by a subnet mask of an IP address of the Preset #1 or Preset#2 and the subnet of the Preset#1 or Preset#2. And, network settings of the corresponding Preset can be applied to the system if the subnet results are the same, thereby allowing the host3 (83) to be joined to the network.

An ARP packet request of the host1 (81) is preferably broadcast type (block S801). A response of the host2 (82) responding to the ARP packet request is preferably unicast type (block S802). The calculation ⑧ of block S803 can be performed on the TCP/IP Preset#1 or Preset#2 set by a user to thus decide an access allowance and a priority.

A packet ⑤ of FIG. 8 can be an ARP request packet for requesting a connection to the Preset#1, and a packet ⑥ can be an ARP request packet for requesting a connection to the Preset#2. A packet ⑦ can be an ARP response for the ARP request, for allowing or rejecting a connection through comparison with network information of the Preset#2 obtained by the calculation ⑧.

For example, regarding TCP/IP Preset#2 information having a connection allowance on the basis of block S803, an ARP request packet ⑥ can be transmitted in broadcast mode (block S804). An ARP response packet ⑦ can be received in unicast mode (block S805).

As described above, one embodiment of a network setting method according to the invention can include storing one or more TCP/IP Preset#1 and TCP/IP Preset#2 information (e.g., set by a user) in a host; if an ARP request of, another host joined to a network is received when the Preset#1 or Preset#2 accesses the network, determining whether or not a subnet result obtained by a subnet mask of an IP of the received ARP request and a subnet of the Preset#1 or #2 stored in the TCP/IP Preset#1 and #2 information is equal to a subnet result obtained by a subnet mask of an IP of the Preset#1 or #2 and the subnet of the Preset#1 or #2; if the subnet results are the same, determining whether or not the Preset#1 or #2 has a network setting allowance; and applying TCP/IP settings of the Preset#1 or #2 to the system and automatically joining the Preset#1 or #2 to the network, according to the determination result.

That is, if an ARP response is received in response to an ARP request for a corresponding Preset decided according to received IP information and Preset information, the Preset can be joined to the network through IP information, gateway, or MAC information of the corresponding Preset. Thus, according to a first embodiment of the invention, by applying an appropriate available setting among pre-set TCP/IP settings without manually establishing a TCP/IP connection, a network can be automatically established. However, the invention is not intended to be so limited.

Embodiments of a network establishment apparatus and method according to a second embodiment of the present invention will now be described using FIGS. 9 through 11. However, the invention is not intended to be so limited.

First, operation conditions of the second embodiment can be as follows.

An ARP packet can be created on the basis of the following information.

1) A destination address (DA) of the ARP packet is ff:ff:ff:ff:ff:ff (e.g., broadcast).

2) A source address (SA) of the ARP packet is a MAC address of a target.

3) A MAC address, that is, a DA MAC address, which will receive a response of the ARP packet, is the MAC address of the target.

4) An IP address that will receive the response of the ARP packet is an IP address of a corresponding Preset.

5) The IP of an object attempting to acquire a MAC address of the ARP packet is a gateway address of the Preset.

In the above descriptions, the 'packet' is a data unit used on TCP/IP and is also called a 'Frame', a 'Segment', or a 'Datagram', etc. in the respective layers of the TCP/IP. Also, the information of the target and the gateway information of the corresponding Preset, among the operation information, can be exchanged with each other as necessary.

Figure 9:
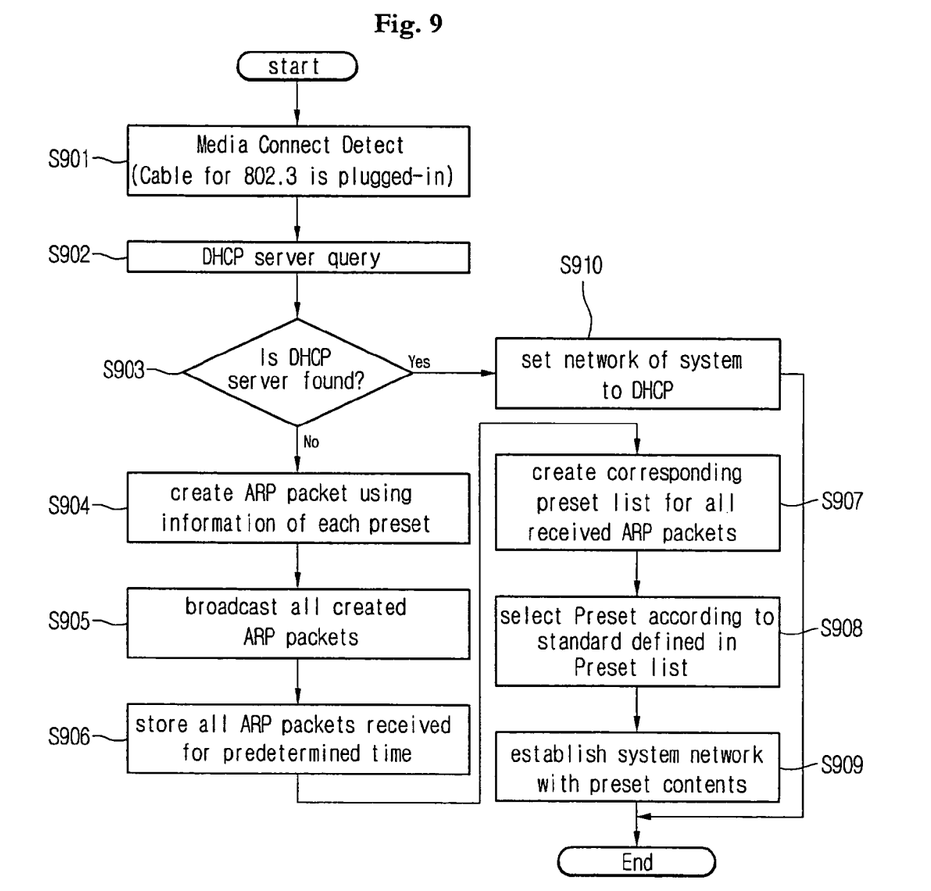
FIG. 9 is a flowchart illustrating another embodiment of a method for establishing a network on the basis of TCP/IP Preset# information pre-set by a user.

FIG. 9 is a flowchart that illustrates a second embodiment of a method for establishing a network on the basis of TCP/IP Preset# information pre-set by a user. As shown in FIG. 9, a process or algorithm can establish a TCP/IP connection with DHCP or predetermined information after a Media Connect Event occurs (e.g., after a LAN cable is plugged in).

As shown in FIG. 9, if a wired equipment is plugged in, it can be determined whether or not a DHCP server exists in a connected network. If a DHCP server exists, network setting can be set to DHCP and then process is terminated (blocks S901, S902, S903, S910).

Otherwise, if no DHCP server exists (block S903), for all Presets (e.g., Presets #1 and #2 of FIG. 11) such as those set by a user, arbitrary ARP requests (e.g., ⑤ and ⑥ of FIG. 11) can be created using a corresponding Preset and information of a target and sequentially broadcasted to the network (blocks S904 and S905).

In operations described above, an ARP request broadcast method can be variously set. For example, the ARP requests can be sequentially broadcasted, be broadcasted with predetermined time intervals or the like.

Thereafter, preferably an ARP response is waited on for a predetermined time, ARP packet is stored, Preset list is made, and a specific Preset is selected according to a predetermined standard (blocks S906, S907, S908). The predetermined standard for selecting the specific Preset can be variously set (e.g., by a user). For example, a Preset first received can be selected. However, the invention is not intended to be so limited.

Then, a network can be established with network settings of the selected Preset (block S909). From blocks S909 and S910, the process can be completed.

Figure 10:
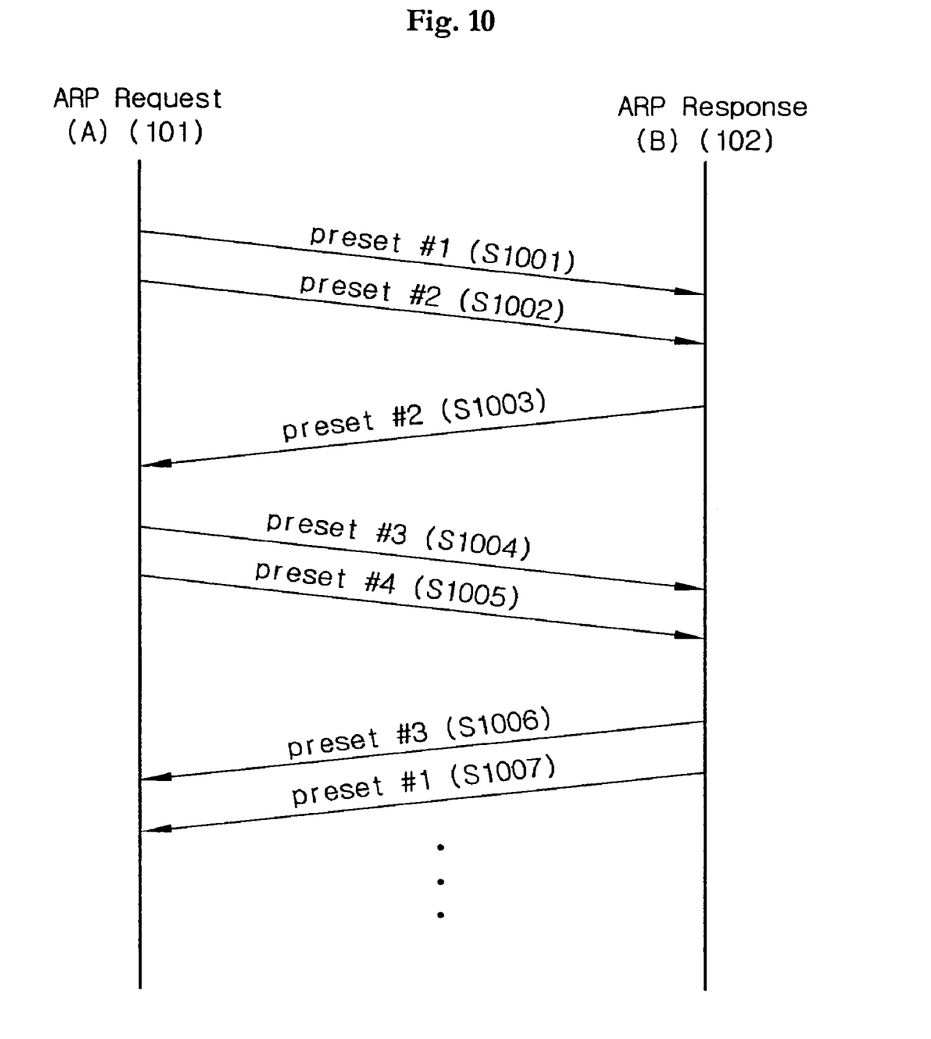
FIG. 10 is a diagram illustrating exemplary ARP responses of a network with respect to ARP requests broadcasted from a host.

FIG. 10 is a diagram that illustrates an exemplary ARP response of a network B 102 with respect to an ARP request broadcasted from a host A 101. As shown in FIG. 10, first, an ARP request for Presets #1 and #2 can be broadcasted to a network (S1001 and S1002). Then, an ARP response for the Preset #2 can be received (S1003).

Successively, ARP requests for Presets #3 and #4 can be broadcasted to the network (S1004 and S1005). Then, ARP responses for the Presets #3 and #1 can be sequentially received (S1006 and S1007).

Accordingly, the user can create and store a list of the ARP responses for the received Presets #2, #3, and #1 and establish a network with network settings of a Preset (for example, the Preset #2) first received.

Figure 11:
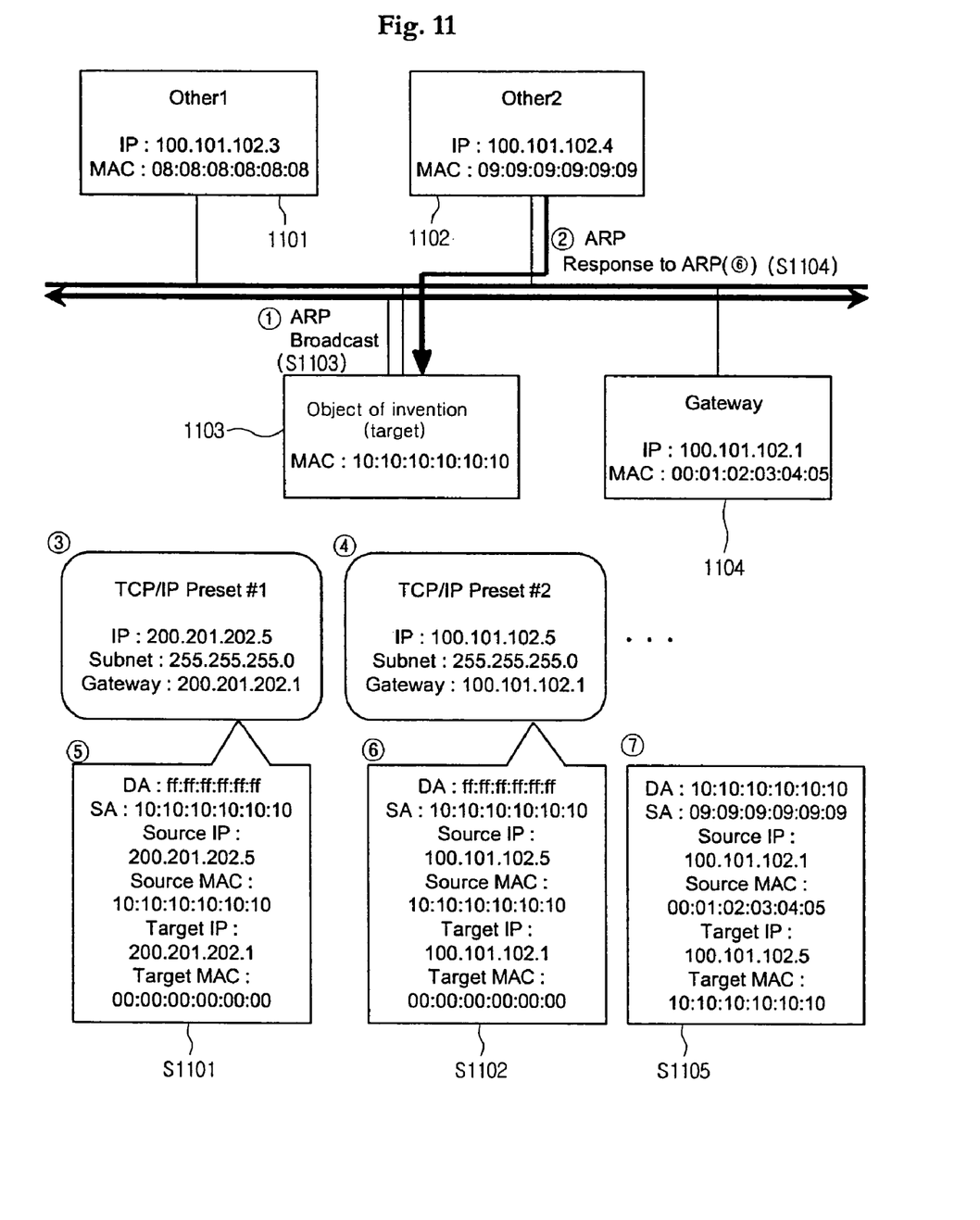
FIG. 11 is a block diagram that illustrates an exemplary method for establishing a network on the basis of ARP requests/responses/acknowledges, according to another embodiment of the invention.

FIG. 11 is a block diagram that illustrates an exemplary method for establishing a network on the basis of an ARP request/response/acknowledge, according to a second embodiment of the present invention. As shown in FIG. 11, there can be a first host having hosts 1 and 2 (1101 and 1102) joined to a network; a host 1103 storing information (③, ④) of a TCP/IP Preset #1 or #2 and attempting to be joined to the network; and a second host including a gateway, which can be a communication interface.

In the exemplary configuration of FIG. 11, no DHCP server is found in the network 1103 to which the target host 1103 is connected, and two networks, Presets ③ and ④, are provided.

First, the target host 1103 can create an ARP packet ⑤ for inquiring a MAC address of a gateway under the assumption that a network, for example, the Preset ③, can be used in a system (S1101).

Also, an ARP packet ⑥ for inquiring a MAC address of a gateway can be created under the assumption that a network, for example, the Preset ④, can be used in the system (S1102). The target host 1103 preferably broadcasts the created ARP packets ⑤ and ⑥ on the network, sequentially, in an inverse order, or simultaneously (S1103).

A system 1102 (other2) among systems on the network can transmit a response ARP packet ⑦ for the ARP packet ⑥ to the target host (S1104 and S1105).

As a result, all systems on the network may not respond to the ARP packet ⑤ transmitted by the target host. That is, as shown in FIG. 11, since no system corresponding to ARP settings of the Preset #1 exists on the network, no ARP information exists.

The target host can compare the received ARP packet ⑦ with the respective Presets (Presets #1 and #2) and find a Preset #2 ④ having the same contents. The target host can apply network settings of the Preset #2 ④ to the system.

As described above, embodiments according to the invention can use the following conditions. 1) Although TCP/IP settings do not meet a current network environment, a broadcast packet can be received. 2) Although TCP/IP settings do not meet a current network environment, a RAW packet can be transmitted. 3) If an ARP is transmitted using an IP address included in a subnet of a network and not assigned, a corresponding response can be received. 4) If a response is received after a target IP is set to a gateway and a reception IP is designated to an IP to be used, a gateway exists on the network and the reception IP is included in the subnet and not currently used.

In the second embodiment as described above, if an ARP for a Preset to be applied is requested and an ARP response is received, the information can be compared with the corresponding Preset, thereby establishing a network. If a plurality of ARP responses are received, a selected or optimal Preset can be established as a network, considering a predetermined condition, for example, a response time, etc.

Although embodiments of the invention were described using TCP/IP communication protocols, the invention is not intended to be so limited. For example, other communication protocols for networks can be used.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of connecting a device to a network, comprising:
   presetting a plurality of TCP/IP addresses in the device;
   plugging the device into the network;
   determining whether any of the preset TCP/IP addresses are usable on the network;
   if the preset TCP/IP addresses are not usable, performing an address resolution protocol (ARP) request with at least one other device connected to the network or with another device having an address preset in the device;
   receiving an ARP response to the ARP request from a correspondent device, the correspondent device corresponding to one of the at least one other device and the another device;
   determining whether it is possible to access the network with a preset TCP/IP address having a predetermined relationship relative to a TCP/IP address included in the ARP response;
   if access to the network is possible with the preset TCP/IP address having said predetermined relationship relative to a TCP/IP address included in the ARP response, establishing a network connection;
   if access to the network is not possible with the preset TCP/IP address having said predetermined relationship relative to a TCP/IP address included in the ARP response, determining whether it is possible to access the network with another preset TCP/IP address;
   if access to the network is possible with the another preset TCP/IP address, establishing the network connection; and
   if access to the network is not possible with any preset TCP/IP address, indicating that a network connection attempt has failed.

2. A method of establishing a connection of a device to a network, comprising:
   presetting a plurality of TCP/IP addresses in the device;
   plugging the device into the network;
   determining whether the network is available to the device;
   if the network is not available, determining whether an address resolution protocol (ARP) packet from other device already connected to the network has been received by the device;
   if the ARP packet from the other device has been received by the device, determining whether a TCP/IP address within the received ARP packet falls within a range of preset TCP/IP addresses;
   if the TCP/IP address within the received ARP packet falls within the range of preset TCP/IP addresses, establishing a detection priority order where a preset TCP/IP address closest to the TCP/IP address within the ARP packet is given a highest priority;
   performing an ARP request process with at least one other device connected to the network or with another device with preset TCP/IP addresses in accordance with the detection priority order;
   receiving an ARP response to the ARP request process from a correspondent device, the correspondent device corresponding to one of the at least one other device and the another device;
   determining whether it is possible to access the network by the device with a preset TCP/IP address having a predetermined relationship relative to a TCP/IP address included in the ARP response;
   if access to the network is possible with the preset TCP/IP address having said predetermined relationship relative to a TCP/IP address included in the ARP response, establishing a network connection;
   if access to the network is not possible with the preset TCP/IP address having said predetermined relationship relative to a TCP/IP address included in the ARP response, determining whether it is possible to access the network with another preset TCP/IP address;
   if access to the network is possible with the another preset TCP/IP address, establishing the network connection; and
   if access to the network is not possible with any preset TCP/IP address, indicating that a network connection attempt has failed.

3. A computer device comprising a processor and a memory, the memory encoded with instructions configured to cause the processor to execute a method of connecting a device to a network, the method comprising:
   presetting a plurality of TCP/IP addresses in the device;
   plugging the device into the network;
   determining whether any of the preset TCP/IP addresses are usable on the network;
   if the preset TCP/IP addresses are not usable, performing an address resolution protocol (ARP) request with at least one other device connected to the network or with another device having an address preset in the device;

receiving an ARP response to the ARP request from a correspondent device, the correspondent device corresponding one of the at least one other device and the another device;

determining whether it is possible to access the network with a preset TCP/IP address closest to a TCP/IP address included in the ARP response;

if access to the network is possible with the preset TCP/IP address closest to a TCP/IP address included in the ARP response, establishing a network connection;

if access to the network is not possible with the preset TCP/IP address closest to a TCP/IP address included in the ARP response, determining whether it is possible to access the network with another preset TCP/IP address;

if access to the network is possible with the another preset TCP/IP address, establishing the network connection; and if access to the network is not possible with any preset TCP/IP address, indicating that a network connection attempt has failed.

4. A computer device comprising a processor and a memory, the memory encoded with instructions configured to cause the processor to execute a method of connecting a device to a network, the method comprising:

presetting a plurality of TCP/IP addresses in the device;

plugging the device into the network;

determining whether the network is available to the device;

if the network is not available, determining whether an address resolution protocol (ARP) packet from other device already connected to the network has been received by the device;

if the ARP packet from the other device has been received by the device, determining whether a TCP/IP address within the received ARP packet falls within a range of preset TCP/IP addresses;

if the TCP/IP address within the received ARP packet falls within the range of preset TCP/IP addresses, establishing a detection priority order where a preset TCP/IP address closest to the TCP/IP address within the ARP packet is given a highest priority;

performing an ARP request process with at least one other device connected to the network or with another device with preset TCP/IP addresses in accordance with the detection priority order;

receiving an ARP response to the ARP request process from a correspondent device, the correspondent device corresponding one of the at least one other device and the another device;

determining whether it is possible to access the network by the device with a preset TCP/IP address closest to a TCP/IP address included in the ARP response;

if access to the network is possible with the preset TCP/IP address closest to a TCP/IP address included in the ARP response, establishing a network connection;

if access to the network is not possible with the preset TCP/IP address closest to a TCP/IP address included in the ARP response, determining whether it is possible to access the network with another preset TCP/IP address;

if access to the network is possible with the another preset TCP/IP address, establishing the network connection; and if access to the network is not possible with any preset TCP/IP address, indicating that a network connection attempt has failed.

* * * * *